(12) United States Patent
Ono

(10) Patent No.: US 8,994,794 B2
(45) Date of Patent: Mar. 31, 2015

(54) IMAGING APPARATUS

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/174,247

(22) Filed: Feb. 6, 2014

(65) Prior Publication Data

US 2014/0152779 A1 Jun. 5, 2014

Related U.S. Application Data

(63) Continuation of application No. PCT/JP2012/066682, filed on Jun. 29, 2012.

(30) Foreign Application Priority Data

Aug. 16, 2011 (JP) ................................ 2011-178067

(51) Int. Cl.
| | |
|---|---|
| H04N 13/02 | (2006.01) |
| H04N 5/369 | (2011.01) |
| H04N 5/232 | (2006.01) |
| G03B 11/00 | (2006.01) |
| G02B 7/34 | (2006.01) |
| G03B 35/04 | (2006.01) |

(52) U.S. Cl.
CPC ......... *H04N 13/0217* (2013.01); *H04N 5/3696* (2013.01); *H04N 5/23212* (2013.01); *G03B 11/00* (2013.01); *G02B 7/34* (2013.01); *G03B 35/04* (2013.01)
USPC .......................................................... 348/49

(58) Field of Classification Search
USPC .......................................................... 348/49
See application file for complete search history.

(56) References Cited

U.S. PATENT DOCUMENTS 7,764,440 B2    7/2010  Border et al.

FOREIGN PATENT DOCUMENTS

| CN | 101874219 | 10/2010 |
|---|---|---|
| JP | 2000-330013 | 11/2000 |
| JP | 2002-350718 | 12/2002 |
| JP | 2007-312311 | 11/2007 |
| JP | 2009-165115 | 7/2009 |
| JP | 2011-095027 | 5/2011 |
| WO | WO 2006/041219 | 4/2006 |
| WO | 2010/050403 | 5/2010 |
| WO | WO 2010050403 A1 * | 5/2010 |

OTHER PUBLICATIONS

International Search Report, PCT/JP2012/066682, Jul. 31, 2012.
Chinese Office Action dated Jul. 22, 2014 in corresponding Chinese Patent Application No. 201280039849.9.

* cited by examiner

*Primary Examiner* — Sath V Perungavoor
*Assistant Examiner* — Jeffery Williams
(74) *Attorney, Agent, or Firm* — Young & Thompson

(57) ABSTRACT

An imaging apparatus includes a first light-shielding member formed in a predetermined optical member included in a photographing optical system, the first light-shielding member dividing a pupil region of the photographing optical system into a first region and a second region and a second light-shielding member letting only a light beam passing through the first region enter a first light-receiving element and letting only a light beam passing through the second region enter a second light-receiving element other than the first light-receiving element.

9 Claims, 7 Drawing Sheets

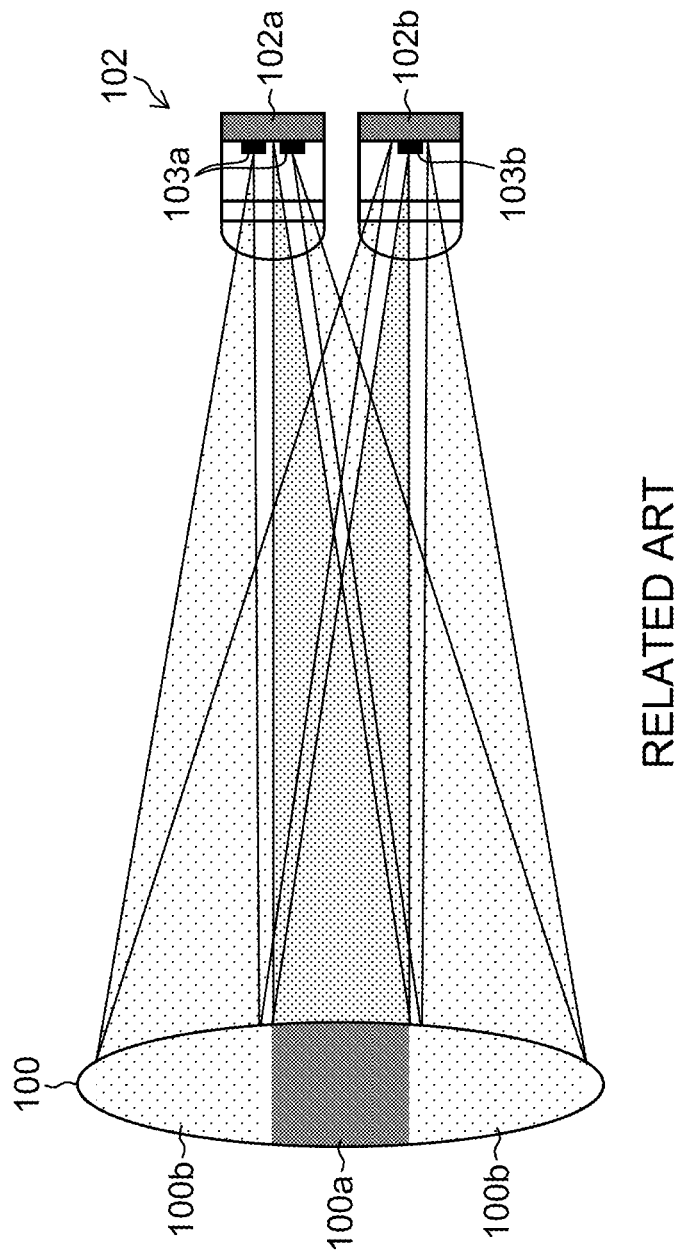

IMAGING APPARATUS

CROSS REFERENCE TO RELATED APPLICATIONS

This application is a continuation of PCT/JP2012/066682 filed on Jun. 29, 2012, which claims foreign priority to Japanese Application No. 2011-178067 filed on Aug. 16, 2011. The entire contents of each of the above applications are hereby incorporated by reference.

BACKGROUND OF THE INVENTION

1. Field of the Invention

The presently disclosed subject matter relates to imaging apparatuses and, in particular, to an imaging apparatus capable of simultaneously obtaining various images.

2. Description of the Related Art

Japanese Patent Application Laid-Open No. 2002-350718 describes that two images with a parallax are obtained by pupil division to detect a focus-adjusted state. Specifically, in Japanese Patent Application Laid-Open No. 2002-350718, two of diaphragm blades forming a diaphragm are projected to an inside of a photographing optical path from a vertical direction to form light passage ports divided in a lateral direction and having a substantially same shape. Then, based on two images obtained at the same timing by an image pickup device where light beams passing through the respective optical passage ports each form an image, an image deviation amount and an image deviation direction are detected, thereby determining the focus-adjusted state of a taking lens.

Japanese Patent Application Laid-Open No. 2009-165115 describes that two images with a parallax are obtained by pupil division. Specifically, in Japanese Patent Application Laid-Open No. 2009-165115, a diaphragm having a plurality of openings formed therein and, with a light-shielding unit that restricts a light-receiving region of each image pickup device, rays of light passing through different openings are received by different image pickup devices to generate a plurality of parallax images.

SUMMARY OF THE INVENTION

However, Japanese Patent Application Laid-Open No. 2002-350718 has a problem in which the capability of separating the pupil region is degraded due to various reasons such as manufacturing error of the image pickup device and signal mixing (so-called crosstalk) tends to occur.

The reason why crosstalk tends to occur is described by using FIG. 10. In FIG. 10, a light beam passing through an peripheral region 100b of a taking lens 100 is shielded by a light-shielding unit 103a provided to a pixel 102a, and a light beam passing through a center region 100a of the taking lens enters the pixel 102a. Also, a light beam passing through the center region 100a is shielded by a light-shielding unit 103b provided to a pixel 102b, and a light beam passing through the peripheral region 100b enters the pixel 102b.

The light-shielding unit 103a is formed to have a size capable of shielding all light beams passing through the peripheral region 100b, and is formed at a position where all light beams passing through the peripheral region 100b can be shielded. Also, the light-shielding unit 103b is formed to have a size capable of shielding all light beams passing through the center region 100a, and is formed at a position where all light beams passing through the center region 100a can be shielded. However, since the center region 100a and the peripheral region 100b are adjacent to each other, if the sizes and positions of the light-shielding units 103a and 103b are displaced even slightly, a light beam originally not to be shielded is shielded, and a light beam originally to be shielded is not shielded. Due to a fine size of the image pickup device, a manufacturing error regarding the size, position, or the like of each of the light-shielding units 103a and 103b tends to occur, and it is difficult to increase accuracy of the shape and position of each of the light-shielding units.

As such, if light beams originally to be shielded are not shielded, the components of the light beams originally to be shielded but entering the image pickup devices 102a and 102b become noises, and thereby so-called crosstalk occurs.

By contrast, in Japanese Patent Application Laid-Open No. 2009-165115, the distance between the openings is kept, and therefore crosstalk tends not to occur. However, in Japanese Patent Application Laid-Open No. 2009-165115, with the plurality of openings formed in the diaphragm, the size of each opening is small, and the light-receiving amount is small, thereby posing a problem of image deterioration.

The presently disclosed subject matter was made in view of these circumstances, and has an object of providing an imaging apparatus capable of photographing a high-quality image, with signal mixing less prone to occur.

To achieve the object above, an imaging apparatus according to an aspect of the presently disclosed subject matter includes a photographing optical system; an image pickup device having a plurality of light-receiving elements two-dimensionally arranged, the image pickup device including a first light-receiving element and a second light-receiving element other than the first light-receiving element; a first light-shielding member having a predetermined width and formed in a predetermined optical member included in the photographing optical system, the first light-shielding member dividing an entire pupil region of the photographing optical system into a first region and a second region; a second light-shielding member provided near the image pickup device, the second light-shielding member configured to make only a light beam passing through the first region enter the first light-receiving element and configured to make only a light beam passing through the second region enter the second light-receiving element; and an image generating device configured to generate a first image from an imaging signal of the first light-receiving element and configured to generate a second image from an imaging signal of the second light-receiving element.

In accordance with the imaging apparatus of the aspect of the presently disclosed subject matter, the first light-shielding member having the predetermined width and formed in the predetermined optical member of the photographing optical system divides the entire pupil region of the photographing optical system into the first region and the second region. Only the light beam passing through the first region by the second light-shielding member is let enter the first light-receiving element, which is a light-receiving element that is a part of the image pickup device. Only the light beam passing through the second region is let enter the second light-receiving element, which is an element other than the first light-receiving element. With this, the light beam passing through the first region and the light beam passing through the second region are mixed and received on the first or second light-receiving element, and therefore the occurrence of signal mixing (crosstalk) on the first or second light-receiving element can be suppressed. Therefore, the need for an image processing to correct image blurring and contrast deterioration occurring due to the crosstalk is eliminated. Also, since the requirements of accuracy of the size and position of light-shielding objects and accuracy of the disposing position of the light-shielding member in an optical axis direction are eased, manufacturing cost can be decreased.

In an imaging apparatus of another aspect of the presently disclosed subject matter, the first light-shielding member may be a light-shielding band formed on a surface of the predetermined optical member configuring the photographing optical system. With this, the number of components can be reduced.

In an imaging apparatus of still another aspect of the presently disclosed subject matter, the image generating device may perform at least one of an interpolating process on the first image to fill a missing pixel due to a presence of the second light-receiving element and an interpolating process on the second image to fill a missing pixel due to a presence of the first light-receiving element. With this, image quality can be improved.

In an imaging apparatus of yet still another aspect of the presently disclosed subject matter, the second light-shielding member may be disposed between the photographing optical system and the image pickup device. With this, a replacement of the second light-shielding member or the like can be facilitated.

In an imaging apparatus of yet still another aspect of the presently disclosed subject matter, the second light-shielding member may be disposed adjacently to a light-receiving surface of the light-receiving element. With this, the number of components can be reduced.

In an imaging apparatus of yet still another aspect of the presently disclosed subject matter, the photographing optical system may be a multifocal lens having a first focal length of the first region and a focal length longer than the first focal length of the second region. With this, a plurality of images with different focal lengths can be simultaneously photographed.

In an imaging apparatus of yet still another aspect of the presently disclosed subject matter, the first light-shielding member may divide into a region with a circular planar shape placed at a center of the predetermined optical member and an annular region placed on an outer edge of the circular region. With the first light-shielding member formed on the surface of the lens, this division of the pupil region can be made.

In an imaging apparatus of yet still another aspect of the presently disclosed subject matter, the photographing optical system may include a plate-shaped member, and the first light-shielding member may be provided to the plate-shaped member. With this, the first light-shielding member can be easily changed.

According to the presently disclosed subject matter, when the pupil region of the photographing optical system is divided into a plurality of divisional regions and light beams passing through different divisional regions are received by different light-receiving elements, the light beams from the plurality of regions are mixed by the light-receiving elements and become less prone to be received. With this, a high-quality image can be photographed, with signal mixing less prone to occur.

BRIEF DESCRIPTION OF THE DRAWINGS

FIG. 10 is a diagram schematically depicting a conventional example.

DETAILED DESCRIPTION OF EXEMPLARY EMBODIMENTS

Embodiments for carrying out the imaging apparatus according to the presently disclosed subject matter are described in detail below according to the attached drawings.

<First Embodiment>

Figure 1:
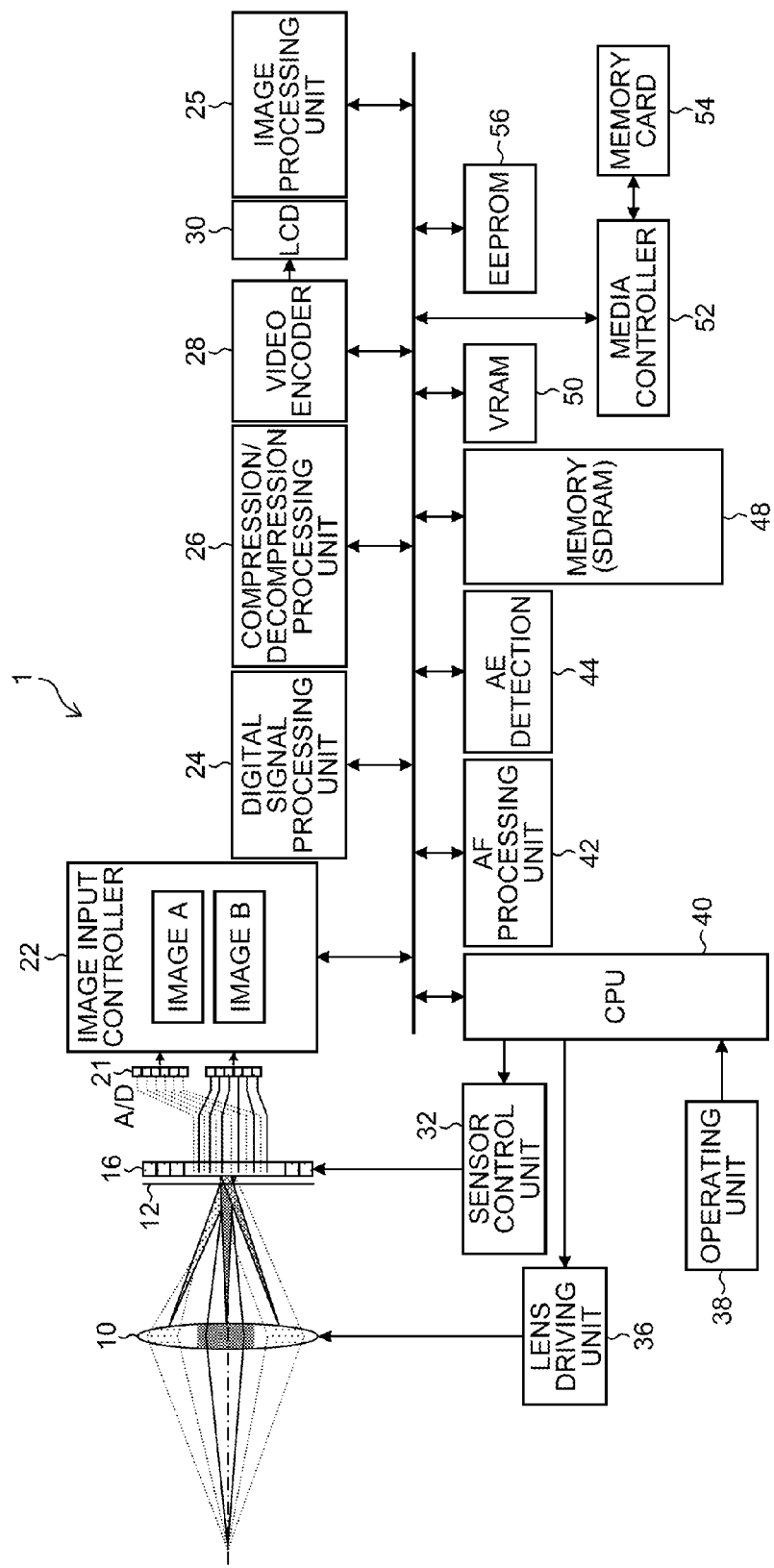
FIG. 1 is a block diagram depicting an inner structure of an imaging apparatus according to a first embodiment of the presently disclosed subject matter.

FIG. 1 is a block diagram depicting an inner structure of an imaging apparatus 1 according to a first embodiment of the presently disclosed subject matter.

The imaging apparatus 1 records an imaged image in a memory card 54. The entire operation of the imaging apparatus 1 is controlled in a centralized manner by a Central Processing Unit (CPU) 40.

The imaging apparatus 1 is provided with an operating unit 38 including a shutter button, a mode dial, a reproduction button, a MENU/OK key, a cross key, and a BACK key. A signal from this operating unit 38 is inputted to the CPU 40, and the CPU 40 controls each circuit of the imaging apparatus 1 based on the input signal. With this, for example, a lens drive control, a diaphragm drive control, a photographing operation control, an image processing control, an image data recording/reproduction control, a display control over a liquid-crystal monitor (LCD) 30 for stereoscopic display, and others are performed.

The shutter button is an operation button for inputting an instruction for starting photographing, and is a switch of a two-step stroke type having an S1 switch that is turned ON at a time of a half press and an S2 switch that is turned ON at a time of a full press. The mode dial is selecting means configured to select any of an auto photographing mode and a manual photographing mode for photographing a still picture, a scene position such as people, landscape, and nightscape, and a moving-picture mode for photographing moving picture.

The reproduction button is a button for switching the operation mode of the imaging apparatus 1 to a reproduction mode for displaying the photographed and recorded still picture or moving picture on the liquid-crystal monitor 30. The MENU/OK key is an operation key having both of a function of a menu button for making an instruction for causing a menu on the screen of the liquid-crystal monitor 30 and a function of an OK button for making an instruction for determining and executing a selected content and the like. The cross key is an operating unit for inputting an instruction in four directions, that is, upward, downward, leftward, and rightward, and is an operating unit (cursor movement operation means) for making an instruction for selecting an item from a menu screen and for selecting various setting items from each menu. Also, an up/down key of the cross key functions as a zoom switch at the time of photographing or a reproduction zoom switch in the reproduction mode. A left/right key functions as a frame advance (forward/backward advance) button in the reproduction mode. The BACK key is used when, for example, a desired target such as a selection item is deleted, an instruction content is cancelled, or the operation state is returned to an immediately previous state.

In a photographing mode, an image of subject light is formed on the light-receiving surface of an image pickup device 16 of a CMOS (Complementary Metal Oxide Semiconductor) type via a photographing optical system (taking lens) 10, a diaphragm (not illustrated), and a light-shielding member 12.

The taking lens 10 is driven by a lens driving unit 36 controlled by the CPU 40. With this, focus control, zoom control, and others are performed.

The lens driving unit 36 moves a focus lens in an optical axis direction for focus adjustment in accordance with an instruction from the CPU 40. Also, the lens driving unit 36 causes a zoom lens to move forward and backward in the optical axis direction to change the focal length in accordance with an instruction from the CPU 40.

The diaphragm includes, for example, five diaphragm blades. The CPU 40 performs five-step diaphragm control in 1 AV steps from diaphragm values of F2.8 to F11.

Figure 4:
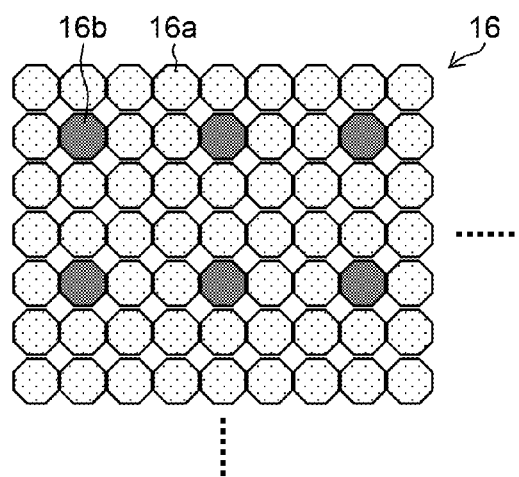
FIG. 4 is a plan view depicting an arrangement of photo sensors of the image pickup device.

On the light-receiving surface of the image pickup device 16, many photo sensors (light-receiving elements) are two-dimensionally arranged (refer to FIG. 4). A subject image formed on the light-receiving surface of each photo sensor is converted to a signal voltage (or electrical charge) with an amount according to the incident light amount.

On a front side of the image pickup device 16, that is, between the taking lens 10 and the image pickup device 16, the light-shielding member 12 is disposed in parallel with the light-receiving surface of the image pickup device 16, that is, in parallel with a plane orthogonal to the optical axis.

Figure 2:
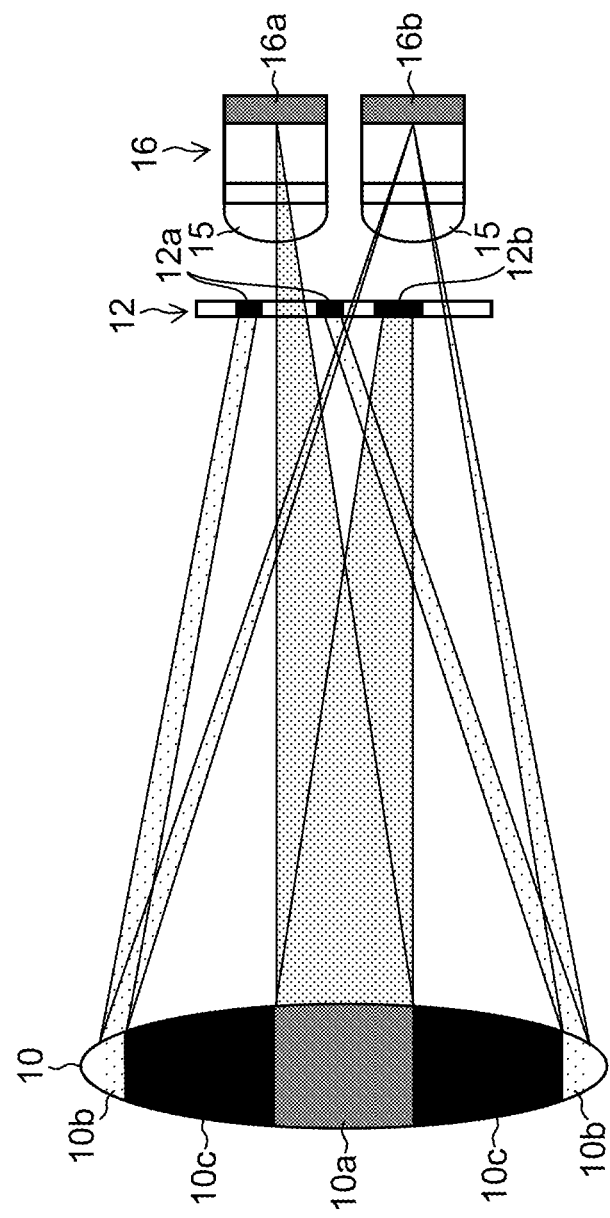
FIG. 2 is a diagram schematically depicting a taking lens, a light-shielding member, and an image pickup device of the imaging apparatus according to the first embodiment of the presently disclosed subject matter.

FIG. 2 is a diagram depicting a positional relation among the taking lens 10, the light-shielding member 12, and image pickup device 16 in the present embodiment. Note that although the taking lens 10 is configured of a plurality of lenses, one lens is depicted schematically in FIG. 2. Also in FIG. 2, for simplification, two photo sensors are depicted as the image pickup device 16, and the light-shielding member 12 is also depicted with a size corresponding to these two photo sensors. However, in practice, any number of photo sensors and the light-shielding member 12 of any size capable of photographing a subject are provided.

Figure 3:
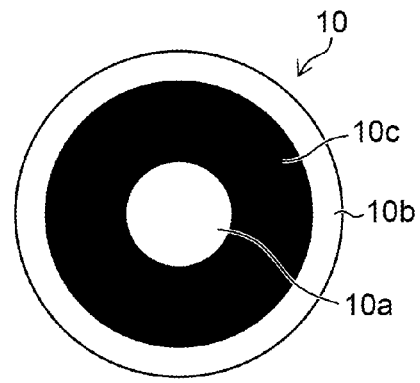
FIG. 3 is a plan view of a planar shape of the taking lens.

The taking lens 10 is a bifocal lens having a region (hereinafter referred to as a near focal region) where convergence is made with a shorter focal length and macro photographing is possible and a region (hereinafter referred to as a far focal region) where convergence is made with a focal length longer than that of the near focal region and landscape and the like can be photographed. The taking lens 10 includes a region with a shape when viewed from front (hereinafter referred to as a planar shape) being circular and an outside annular region, as depicted in FIG. 3. The circular region at the center is a far focal region 10*a*, and the annular region is a near focal region 10*b*.

As depicted in FIG. 3, a light-shielding band 10*c* is formed on the surface of a predetermined optical member (a predetermined lens) forming the taking lens 10. The light-shielding band 10*c* is a black donut-shaped region having a predetermined width, dividing an entire pupil region into the far focal region 10*a* and the near focal region 10*b*. This light-shielding band 10*c* prevents mixture of light passing through the far focal region 10*a* and light passing through the near focal region 10*b*. In the present embodiment, since the light-shielding band 10*c* is formed on the surface of the predetermined lens, the pupil region can be divided into a circular region and an outer annular region.

Note that the predetermined lens may be a lens which is closest to the image pickup device 16, in a lens group forming the taking lens 10. Also, the light-shielding band 10*c* may be provided to a prism or an optical filter. Furthermore, the predetermined lens may be configured to have two lenses, that is, a lens in the far focal region 10*a* and a lens in a near focal region 10*b*, connected to each other via the light-shielding band 10*c*. Still further, the light-shielding band 10*c* may be provided on a surface on an image pickup device 16 side of the predetermined lens, or may be provided not only on the surface of the predetermined lens but also inside the predetermined lens.

Images of light beams passing through the far focal region 10*a* and the near focal region 10*b* of the taking lens 10 are formed at the respective photo sensors of the image pickup device 16 by a microlens 15. The image pickup device 16 includes far-image light-receiving cells 16*a* which a light beam passing through the far focal region 10*a* enters and near-image light-receiving cells 16*b* which a light beam passing through the near focal region 10*b* enters. The near-image light-receiving cells 16*b* are placed at a ratio of one to nine pixels (3×3), as depicted in FIG. 4. In the present embodiment, an image obtained from the far-image light-receiving cells 16*a* is a main image, and an image obtained from the near-image light-receiving cells 16*b* is a sub-image. That is why many far-image light-receiving cells 16*a* are placed.

The light-shielding member 12 is provided at a position a predetermined distance away from a front surface of the image pickup device 16. As a material of the light-shielding member 12, a transparent glass plate having a thickness on the order of 10 μm to 100 μm is used. On the surface of the light-shielding member 12, light-shielding objects 12*a* and 12*b* are formed. As the light-shielding member 12, a cover glass of the image pickup device 16 can be used. The light-shielding member 12 is not limited to a glass, and a transparent film extended over a plate-shaped frame can be used.

Figure 5:
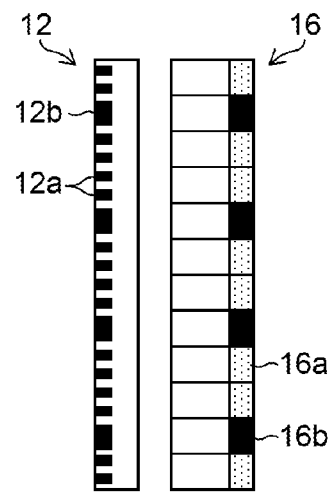
FIG. 5 is a diagram schematically depicting the light-shielding members and the image pickup device.

As depicted in FIG. 5, the light-shielding objects 12*a* are provided to the light-shielding member 12 so as to correspond to the far-image light-receiving cells 16*a*, that is, so as to be positioned at front surfaces of the far-image light-receiving cells 16*a*. Also, the light-shielding objects 12*b* are provided to the light-shielding member 12 so as to correspond to the near-image light-receiving cells 16*b*, that is, so as to be positioned at front surfaces of the near-image light-receiving cells 16*b*. The light-shielding objects 12*a* and 12*b* are black (optically non-transmission) regions formed on the surface of the light-shielding member 12 by etching or the like. The light-shielding objects 12*a* form a donut-shaped region having a circular opening at the center thereof with a diameter on the order of 5 μm, and the light-shielding objects 12*b* form a circular region having a diameter on the order of 5 μm. This 5 μm is a value determined so as to be substantially equal to the diameter of each photodiode sensor of the image pickup device 16. By forming the light-shielding objects 12*a* and 12*b* by etching, the small light-shielding objects 12*a* on the order of 5 μm can be accurately formed at fine spacing.

The light-shielding member 12 is disposed at a position a predetermined distance away from the image pickup device 16 so that the light-shielding objects 12*a* shield all light beams passing through the near focal region 10b, and the light-shielding objects 12b shield all light beams passing through the far focal region 10a. Since the light-shielding objects 12a are provided so as to correspond to the far-image light-receiving cells 16a, as depicted in FIG. 2, with the principle of silhouettes, the light-shielding objects 12a shield light beams passing through the near focal region 10b, and only light beams passing through the far focal region 10a enter the far-image light-receiving cells 16a. Also, since the light-shielding objects 12b are provided so as to correspond to the near-image light-receiving cells 16b, as depicted in FIG. 2, with the principle of silhouettes, the light-shielding objects 12b shield light beams passing through the far focal region 10a, and only light beams passing through the near focal region 10b enter the near-image light-receiving cells 16b. With this structure, only a light beam passing through a desire region of the taking lens system can be received by the photo sensors.

In the present embodiment, since the light-shielding band 10c is formed in the taking lens 10, even if accuracy of formation of the light-shielding objects 12a and 12b is somewhat low, it is possible to effectively prevent light beams passing through the far focal region 10a from entering the near image light-receiving cells 16b and effectively prevent light beams passing through the near focal region 10b from entering the far-image light-receiving cells 16a. Therefore, requirements of accuracy of the sizes and forming positions of the light-shielding objects 12a and 12b and accuracy of the disposing position of the light-shielding member 12 in the optical axis direction can be eased.

Note that although twelve photo sensors, eight light-shielding objects 12a, and four light-shielding objects 12b are depicted in the image pickup device 16 in FIG. 5, the numbers of these optical elements are not restricted to the above.

Incident light entering the image pickup device 16 is converted to electrical charge according to its light amount, and is accumulated in the photo sensors themselves or capacitors annexed thereto. The electrical charge accumulated in the image pickup device 16 is read as a voltage signal according to the charge amount by following a drive signal from a sensor control unit 32, and is retained together with information about the relevant pixel position. The voltage signal for each pixel is read by using, for example, a methodology of a MOS-type image pickup device (so-called CMOS sensor) using an X-Y address scheme, together with selection information about the pixel position of a read target.

The voltage signal read from the image pickup device 16 is subjected to a correlated double sampling process (processing for reducing noise (in particular, thermal noise) and the like included in the output signal from the image pickup device). Specifically, with a process of obtaining accurate pixel data by taking a difference between a feed-through-component level (a signal during a zero-level period in which the signal level is at zero) included in the output signal for each pixel of the image pickup device 16 and a pixel signal component level, R (red), G (green) and B (blue) signals for each pixel are sampled and held, amplified, and then added to an A/D converter 21. The A/D converter 21 converts sequentially inputted analog voltages (R, G, and B signals) to digital R, G, and B signals to output to an image input controller 22.

A digital signal processing unit 24 performs predetermined signal processing on the digital image signal inputted via the image input controller 22, the signal processing such as offset processing, gain control processing including white balance correction and sensitivity correction, gamma correction processing, YC processing (processing of converting R, G, and B color signals to luminance signals and color-difference signals).

The image data processed in the digital signal processing unit 24 is inputted to a VRAM (Video Random Access Memory) 50. The image data read from the VRAM 50 is encoded by a video encoder 28, and is outputted to a liquid-crystal monitor 30 for stereoscopic display provided to a back surface of a camera. With this, a 3D subject image is displayed on a display screen of the liquid-crystal monitor 30.

When a push at a first stage (a half press) of the shutter button of the operating unit 38 is provided, the CPU 40 starts an automatic focus adjustment (AF) operation and an automatic exposure control (AE) operation, controlling the focus lens in the taking lens 10 via the lens driving unit 36 so that the focus lens comes at an in-focus position. Also, the image data outputted from the A/D converter 21 at the time of the half press of the shutter button is captured by an AE detecting unit 44.

The AE detecting unit 44 accumulates G signals on the entire screen or G signals weighted differently between a screen center portion and a peripheral portion, and outputs the accumulated value to the CPU 40. The CPU 40 calculates a brightness (a photographing Ev value) of the subject from the accumulated value inputted from the AE detecting unit 44. Based on the photographing Ev value, the CPU 40 determines a diaphragm value of the diaphragm and an electronic shutter (a shutter speed) of the image pickup device 16 by following a program chart. The CPU 40 then controls the diaphragm via a diaphragm driving unit (not depicted in the drawing) based on the determined diaphragm value, and controls a charge accumulation time of the image pickup device 16 via the sensor control unit 32 based on the determined shutter speed.

An AF processing unit 42 performs contrast AF processing or phase AF processing. When contrast AF processing is performed, high-frequency components of image data in a predetermined focus region of the image data are extracted, and these high-frequency components are integrated, thereby calculating an AF evaluation value indicating an in-focus state. By controlling the focus lens in the taking lens 10 so that this AF evaluation value becomes maximum, AF control is performed. Also, when phase-difference AF processing is performed, a phase difference between image data (image data A) corresponding to the main pixels (the far-image light-receiving cells 16a) in a predetermined focus region of the image data and image data (image data B) corresponding to the sub-pixels (the near-image light-receiving cells 16b) is detected and, based on information indicating the phase difference, a defocus amount is found. By controlling the focus lens in the taking lens 10 so that this defocus amount is 0, AF control is performed.

When the AE operation and the AF operation end and a press at a second stage (a full press) of the shutter button is provided, image data outputted from the A/D converter 21 in response to the press is inputted from the image input controller 22 to a memory (SDRAM (Synchronous Dynamic Random Access Memory)) 48 for temporary storage. In the present embodiment, either one of the image data A read from the far-image light-receiving cells 16a and the image data B read from the near-image light-receiving cells 16b or both of the image data A read from the far-image light-receiving cells 16a and the image data B read from the near-image light-receiving cells 16b can be obtained upon instruction from a photographer or automatically by the CPU 40.

The image data temporarily stored in the memory 48 is read by the digital signal processing unit 24 as appropriate, wherein predetermined signal processing including a processing of generating luminance data and color-difference data of the image data (YC processing) is performed. The image data subjected to the YC processing (YC data) is again stored in the memory 48.

Subsequently, the YC data is read from the memory 48 to an image processing unit 25. The image processing unit 25 performs image processing on the image data A read from the far-image light-receiving cells 16a and the image data B read from the near-image light-receiving cells 16b. The image processing unit 25 then generates a far-distance image from the image data A read from the far-image light-receiving cells 16a, and generates a macro image from the image data B read from the near-image light-receiving cells 16b. In the following, the processing performed by the image processing unit 25 is described. However, the processing performed by the image processing unit 25 is not indispensable.

Since the near-image light-receiving cell 16b is included in the image pickup device 16 at the ratio of one pixel to nine pixels (3×3) (refer to FIG. 4), the far-distance image generated from the image data A read from the far-image light-receiving cells 16a does not include data corresponding to a pixel position where the near-image light-receiving cell 16b is present. Therefore, regarding a missing pixel due to the presence of the near-image light-receiving cell 16b, an interpolating process is performed based on the image data of the surrounding far-image light-receiving cells 16, and image data corresponding to the pixel position of the near-image light-receiving cell 16b is generated (a self-interpolating process). Since the interpolating process is known, its description is omitted. Note that any number of columns for use in interpolation and any mode of weighting can be selected as appropriate.

Since only the light beams passing through the near focal region 10b enter the near-image light-receiving cells 16b, it is not imperative to perform a blurring correction process and a contrast correction process on the image data B read from the near-image light-receiving cells 16b. However, the size of the near focal region 10b is sufficiently small compared with the size of the far focal region 10a, and the number of near-image light-receiving cells 16b is smaller compared with that of far-image light-receiving cells 16a (in the present embodiment, at the ratio of one pixel to nine pixels (3×3)). Therefore, the macro image generated from the image data B obtained from the near-image light-receiving cells 16b is dark. Therefore, a process of brightening the brightness of the image data B read from the near-image light-receiving cells 16b is performed.

In the present embodiment, since the near-image light-receiving cells 16b are placed in a form of being embedded in the far-image light-receiving cells 16a, a self-interpolating process is performed on the far-distance image generated from the image data A read from the far-image light-receiving cells 16a. However, when the far-image light-receiving cells 16a and the near-image light-receiving cells 16b are present at an approximately same ratio, a self-interpolating process may be performed on both of the far-distance image generated from the image data A read from the far-image light-receiving cells 16a and the macro image generated from the image data B read from the near-image light-receiving cells 16b. Alternatively, a self-interpolating process may be performed on any one image.

The far-distance image and the macro image subjected to the image processing by the image processing unit 25 in this manner are each outputted to a compression/decompression processing unit 26, where a process of compression to compressed data of a predetermined format such as JPEG (Joint Photographic Experts Group) is performed.

When a multipicture file (an MP file: a file of a format where a plurality of images are coupled together) is generated from this compressed data, the compressed data is again temporarily stored in the memory 48. Then, an MP file for storing a plurality of pieces of compressed data (for example, the far-distance image obtained from the far-image light-receiving cells 16a and the macro image obtained from the near-image light-receiving cells 16b) stored in the memory 48 is generated. The generated MP file is recorded on a memory card 54 via a media controller 52. With this, a plurality of images with different focal lengths can be simultaneously photographed.

Note that the far-distance image and the macro image may be stored in separate image files (for example, JPEG). In this case, the image file for storing the far-distance image and the image file for storing the macro image are recorded in association with each other. The association between the image file for storing the far-distance image and the image file for storing the macro image is performed by, for example, a method of including a common character string in the file name of each image file or a method of recording information indicating the correspondence between the image files on accessory information (header information) of each image file or a dedicated management file.

In the reproduction mode, an image file selected via the operating unit 38 from among the image files recorded on the memory card 54 is read via the media controller 52. Then, the compressed data in the read image file is decompressed by the compression/decompression processing unit 26 for output to the liquid-crystal monitor 30 via the video encoder 28. With this, reproduction and display of the image data is performed.

According to the present embodiment, since the light-shielding band 10c is provided to the taking lens 10, mixing of light-receiving signals (crosstalk) is less prone to occur, the mixing occurring because the light beams passing through the far focal region 10a and the light beams passing through the near focal region 10b are mixed and received by the far-image light-receiving cells 16a or the near-image light-receiving cells 16b. Therefore, the need for image processing to correct image blurring and contrast deterioration occurring due to the crosstalk is eliminated.

Also, according to the present embodiment, since the light-shielding band 10c is provided to the taking lens 10, the light beams passing through the far-focal region 10a is separated from the light beams passing through the near-focal region 10b by a distance corresponding to the width of the light-shielding band 10c. Requirements of accuracy of the size and position of the light-shielding objects 12a and 12b for reliably shielding the light beams outside the light-receiving target and accuracy of the disposing position of the light-shielding member 12 in an optical axis direction can be eased (an allowable error is increased). Therefore, manufacturing cost of the light-shielding member 12 and the like can be decreased.

<Second Embodiment>

Figure 6:
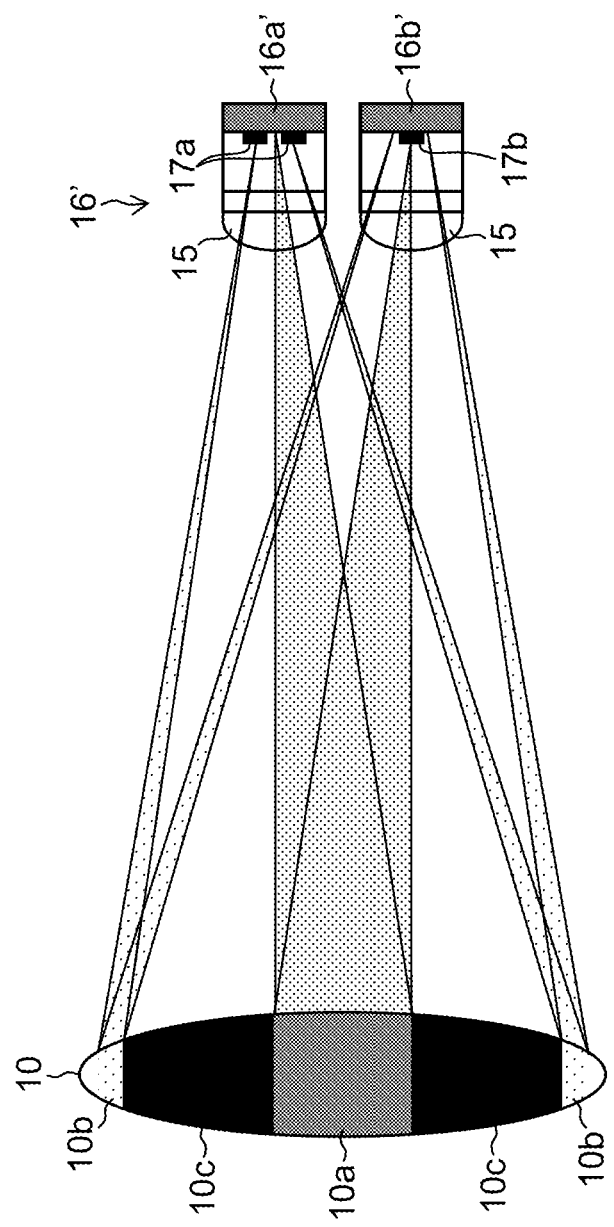
FIG. 6 is a diagram schematically depicting a taking lens, light-shielding members, and an image pickup device of an imaging apparatus according to a second embodiment of the presently disclosed subject matter.

Although in the present embodiment, the light-shielding member 12 and the image pickup device 16 are formed of different members, as depicted in FIG. 6, a light-shielding object may be provided inside the image pickup device 16. Note in FIG. 6 that, for simplification, two photo sensors are depicted as the image pickup device 16, and the light-shielding member 12 is depicted so as to have a size corresponding to two photo sensors, but these optical elements are not restricted to these. In practice, any number of optical elements of any size capable of photographing a subject are provided. Also, portions identical to those of FIG. 2 are provided with the same reference character, and their description is omitted.

As depicted in FIG. 6, a far-image light-receiving cell 16a' is provided with a light-shielding object 17a, and a near-image light-receiving cell 16b' is provided with a light-shielding object 17b. The light-shielding object 17a has an annular shape, and the light-shielding object 17b has a circular shape. The light-shielding objects 17a and 17b are provided on a front surface of a light-receiving surface of each photo sensor of an image pickup device 16' so as to be adjacent to the light-receiving surface.

Since the light-shielding object 17a is provided to the far-image light-receiving cell 16a', the light-shielding object 17a shields a light beam passing through the near focal region 10b, and only a light beam passing through the far focal region 10a enters the far-image light-receiving cell 16a'. Also, since the light-shielding object 17b is provided to the near-image light-receiving cell 16b', the light-shielding object 17b shields a light beam passing through the far focal region 10a, and only a light beam passing through the near focal region 10b enters the near-image light-receiving cell 16b'. With this structure, only the light beam passing through a desired region of the taking lens system can be received by the photo sensor. Also, the number of components can be reduced.

However, the light-shielding member 12 and the image pickup device 16 are preferably separate members because removal and replacement of the light-shielding member is easy and low-volume high-variety production and design change can be supported without an increase in cost. Also, by disposing the light-receiving member 12 outside the image pickup device 16, noise due to diffraction of light at an end face or the like of the light-shielding object 12a or 12b is eliminated, thereby improving image quality.

<Third Embodiment>

Also, while the light-shielding band 10c is formed on the surface of the predetermined lens forming the taking lens 10 to prevent mixing of light passing through the far focal region 10a and light passing through the near focal region 10b in the present embodiment, the method of preventing mixing of the light passing through the far focal region 10a and light passing through the near focal region 10b is not restricted to this. For example, as depicted in FIG. 7, a light-shielding member for pupil division may be provided in the taking lens.

Figure 7:
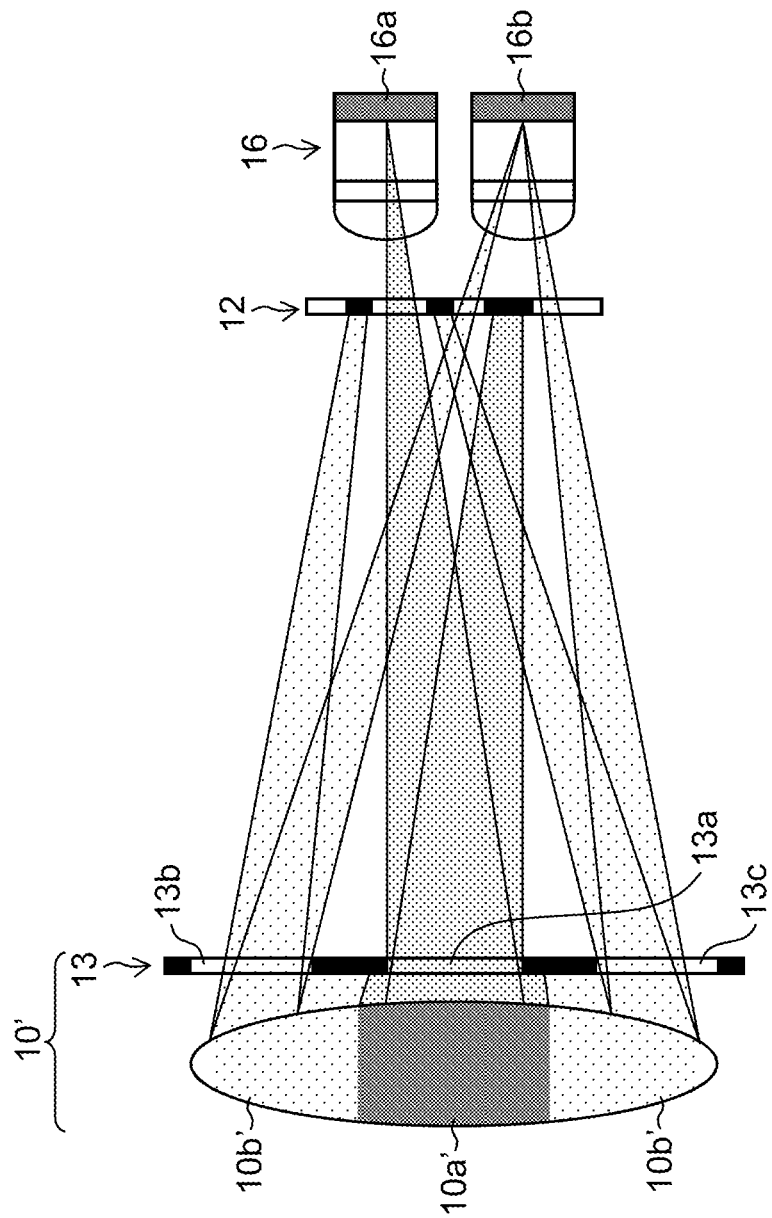
FIG. 7 is a diagram schematically depicting a taking lens, light-shielding members, and an image pickup device of an imaging apparatus according to a third embodiment of the presently disclosed subject matter.

As depicted in FIG. 7, in a plate-shaped light-shielding member 13 provided at a desired position in a taking lens 10', a circular opening 13a and semi-annular openings 13b and 13c each having a predetermined width are formed so that light passing through the far focal region 10a passes the opening 13a and light passing through the near focal region 10b passes the openings 13b and 13c. With this, light passing through a portion near a boundary between the far focal region 10a and the near focal region 10b is shielded by walls among the openings 13a, 13b, and 13c of the light-shielding member 13, thereby preventing mixing of light passing through the far focal region 10a and light passing through the near focal region 10b. In this case, removal and replacement of the light-shielding member 13 is easy. In this case, however, the openings 13b and 13c each have a semi-annular shape, and partial regions left and right (or above and below) the near focal region 10b is light-shielded. However, the influence can be reduced by adjusting the width of a light-shielding band between the openings 13b and 13c. Note that, in order to prevent mixing of light passing through the far focal region 10a and light passing through the near focal region 10b, the light-shielding member 13 is preferably disposed near a desired lens as closely as possible.

Figure 8:
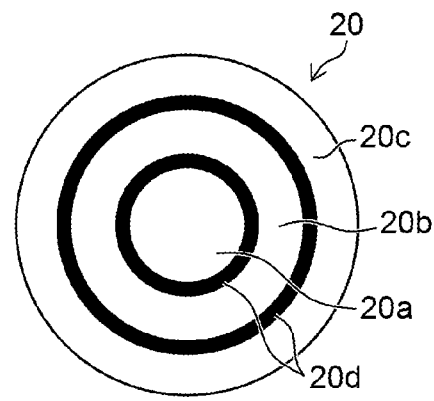
FIG. 8 is a diagram depicting a first modification example of division of a pupil region of the taking lens.
Figure 9A:
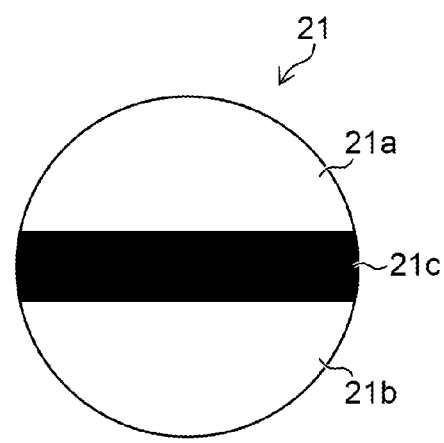
FIG. 9A is a diagram depicting a second modification example of division of a pupil region of the taking lens.
Figure 9B:
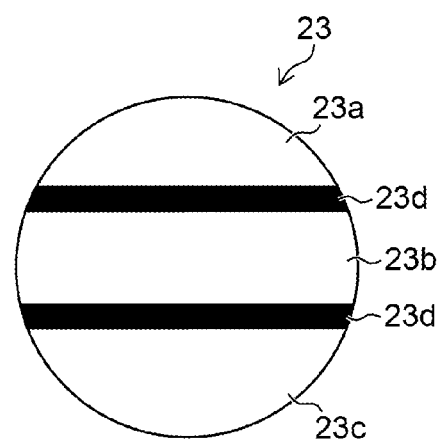
FIG. 9B is a diagram depicting a third modification example of division of a pupil region of the taking lens.

Also, while the taking lens 10 divided into the far focal region 10a and the near focal region 10b by the light-shielding band 10c is used in the present embodiment, the method of dividing the taking lens is not restricted to this. As depicted in FIG. 8, a taking lens 20 divided into three regions 20a, 20b, and 20c by a light-shielding band 20d may be used. Furthermore, while the taking lens divided into the circular far focal region 10a at the center and the peripheral near focal region 10b is used in the present embodiment, a taking lens 21 divided into two regions 21a and 21b by a light-shielding band 21c in a vertical direction as depicted in FIG. 9A may be used. Alternatively, a taking lens divided into two regions by a light-shielding band in a lateral direction may be used. Still further, a taking lens 23 divided into three regions 23a, 23b, and 23c by a light-shielding band 23d as depicted in FIG. 9B may be used. Note that since the taking lens is divided in to two regions in the present embodiment, the image pickup device has two different directional characteristics, but when the taking lens is divided into three or more regions, the image pickup device is required to have different directional characteristics of three types.

Yet still further, while the taking lens 10 having the far focal region 10a and the near focal region 10b formed with a substantially same area is used in the present embodiment, the size of the far focal region 10a and the size of the near focal region 10b are not restricted to this. For example, the far focal region 10a may be formed wider than the near focal region 10b. However, when the far distance image is taken as a main and the macro image is taken as a sub, in consideration of image quality and light amounts, it is preferable to form the far focal region 10a wider compared with the near focal region 10b.

Yet still further, while a multifocal lens having different focal length regions is used as the taking lens 10 in the present embodiment, the taking lens 10 is not restricted to this mode. For example, a various characteristic lens such as a lens having a plurality of regions with different transmission wavelength regions or a lens having a plurality of various regions with different colors can be used. Furthermore, a normal lens can also be used as the taking lens 10. In this case, by using the fact that the MTF (Modulation Transfer Function) differs depending on the position of the lens, an image with a different MTF characteristic may be obtained in each of the circular region at the center and the outer annular region.

Yet still further, while the near-image light-receiving cells 16b are placed at the ratio of one pixel to nine pixels (3×3) in the present embodiment, the ratio between the far-image light-receiving cells 16a and the near-image light-receiving cells 16b is not restricted to this. For example, when the far distance image is taken as a main and the far focal region 10a is formed wider than the near focal region 10b, the ratio between the far-image light-receiving cells 16a and the near-image light-receiving cells 16b may be substantially equal to the ratio between the far focal region 10a an the near focal region 10b.

Yet still further, while the microlens 15 is used to form an image of the subject light at the photo sensor in the present embodiment, the microlens is not indispensable. When a problem in space or the like is present, the microlens may not be used.

Note that while description has been made in the present embodiment with the example in which a CMOS is used as an image pickup device, the image pickup device is not restricted to a CMOS. The presently disclosed subject matter can be applied also to an image sensor such as a CCD (Charge Coupled Device).

While the presently disclosed subject matter has been described by using the embodiments, the technical scope of the presently disclosed subject matter is not restricted to the range described in the embodiments described above. It is obvious for a person skilled in the art that it is possible to variously change or improve the embodiments described above. It is obvious from the description of the claims that embodiments with such modification or improvement can also be included in the technical scope of the presently disclosed subject matter. The presently disclosed subject matter is not particularly restricted to an imaging apparatus capable of photographing a plurality of images with different characteristics, but can be applied also to a monocular stereoscopic imaging apparatus which photographs a stereoscopic image with one optical system by pupil division or a phase-difference focus detecting apparatus.

It should be noted that performing processes such as operations, procedures, steps, and stages in the apparatus, system, program, and method described in the claims, specification, and drawings can be achieved in any sequence unless specifically and clearly stated as "before", "prior to", or the like, or unless an output from a previous process is used in a subsequent process. Regarding any operation flow in the claims, specifications, and drawings, even if description is made by using "first", "next", or the like for convenience, this does not mean that it is imperative to perform in this sequence.

What is claimed is:

1. An imaging apparatus comprising:
a photographing optical system;
an image pickup device having a plurality of light-receiving elements two-dimensionally arranged, the image pickup device including a first light-receiving element and a second light-receiving element other than the first light-receiving element;
a first light-shielding member having a predetermined width and formed in a predetermined optical member included in the photographing optical system, the first light-shielding member dividing an entire pupil region of the photographing optical system into a first region and a second region;
a second light-shielding member provided near the image pickup device, the second light-shielding member configured to make only a light beam passing through the first region enter the first light-receiving element and configured to make only a light beam passing through the second region enter the second light-receiving element; and
an image generating device configured to generate a first image from an imaging signal of the first light-receiving element and configured to generate a second image from an imaging signal of the second light-receiving element.

2. The imaging apparatus according to claim 1, wherein the first light-shielding member is a light-shielding band formed on a surface of the predetermined optical member.

3. The imaging apparatus according to claim 1, wherein the image generating device performs at least one of an interpolating process on the first image to fill a missing pixel due to presence of the second light-receiving element and an interpolating process on the second image to fill a missing pixel due to presence of the first light-receiving element.

4. The imaging apparatus according to claim 2, wherein the image generating device performs at least one of an interpolating process on the first image to fill a missing pixel due to presence of the second light-receiving element and an interpolating process on the second image to fill a missing pixel due to presence of the first light-receiving element.

5. The imaging apparatus according to claim 1, wherein the second light-shielding member is disposed between the photographing optical system and the image pickup device.

6. The imaging apparatus according to claim 1, wherein the second light-shielding member is disposed adjacently to a light-receiving surface of the light-receiving element.

7. The imaging apparatus according to claim 1, wherein the photographing optical system is a multifocal lens having a first focal length of the first region and a focal length longer than the first focal length of the second region.

8. The imaging apparatus according to claim 2, wherein the first light-shielding member divides into a region with a circular planar shape placed at a center of the predetermined optical member and an annular region placed on an outer edge of the circular region.

9. The imaging apparatus according to claim 1, wherein the photographing optical system includes a plate-shaped member, and
the first light-shielding member is provided to the plate-shaped member.

* * * * *